(12) United States Patent
Tanikawa (10) Patent No.: US 11,943,496 B2
(45) Date of Patent: Mar. 26, 2024

(54) RECEPTION DEVICE, COMMUNICATION SYSTEM, PROGRAM, AND RECEPTION METHOD

(71) Applicant: Sony Interactive Entertainment Inc., Tokyo (JP)

(72) Inventor: Masakazu Tanikawa, Chiba (JP)

(73) Assignee: Sony Interactive Entertainment Inc., Tokyo (JP)

( * ) Notice: Subject to any disclaimer, the term of this patent is extended or adjusted under 35 U.S.C. 154(b) by 287 days.

(21) Appl. No.: 17/436,230

(22) PCT Filed: Mar. 18, 2019

(86) PCT No.: PCT/JP2019/011168
§ 371 (c)(1),
(2) Date: Sep. 3, 2021

(87) PCT Pub. No.: WO2020/188699
PCT Pub. Date: Sep. 24, 2020

(65) Prior Publication Data
US 2022/0132197 A1 Apr. 28, 2022

(51) Int. Cl.
*H04N 21/43* (2011.01)
*H04N 21/414* (2011.01)

(52) U.S. Cl.
CPC ... *H04N 21/4305* (2013.01); *H04N 21/41407* (2013.01)

(58) Field of Classification Search
CPC ............ H04N 21/4305; H04N 21/41407
See application file for complete search history.

(56) References Cited

U.S. PATENT DOCUMENTS 8,233,540 B2 7/2012 Walker
9,055,225 B2 6/2015 Yanagidate
(Continued)

FOREIGN PATENT DOCUMENTS

JP 2008535291 A1 8/2008
JP 2010181616 A 8/2010
(Continued)

OTHER PUBLICATIONS

International Search Report for corresponding PCT Application No. PCT/JP2019/011168, 4 pages, dated Jun. 11, 2019.

*Primary Examiner* — Fabio S Lima
(74) *Attorney, Agent, or Firm* — Matthew B. Dernier, Esq.

(57) ABSTRACT

To reduce the possibility of occurrence of problems such as missing frames and an increase in display delay even if a disturbance occurs in a communication path. A reception device includes a reception unit that sequentially receives image information transmitted by a transmission device at a given first interval by wireless communication, a display unit that sequentially displays frame images on the basis of the image information in accordance with a display clock and generates display time information indicating a time corresponding to the update time of the frame image, and a control unit that calculates a second interval indicating an interval at which the frame images are displayed on the basis of plural pieces of the display time information and controls the update cycle of the frame image in accordance with the display clock such that the second interval approximates to the first interval.

9 Claims, 4 Drawing Sheets (56) References Cited

U.S. PATENT DOCUMENTS

| | | | |
|---|---|---|---|
| 2006/0209966 A1* | 9/2006 | Walker | H04N 21/4344 |
| | | | 348/E7.003 |
| 2011/0234897 A1* | 9/2011 | Yamamoto | G09G 3/3208 |
| | | | 348/E7.003 |
| 2013/0100331 A1 | 4/2013 | Yanagidate | |
| 2017/0111565 A1* | 4/2017 | Shibahara | H04N 21/242 |

FOREIGN PATENT DOCUMENTS

| | | | |
|---|---|---|---|
| JP | 2011155486 A | | 8/2011 |
| JP | 2012005025 A | | 1/2012 |
| KR | 20070054269 A | * | 5/2007 |

* cited by examiner

RECEPTION DEVICE, COMMUNICATION SYSTEM, PROGRAM, AND RECEPTION METHOD

TECHNICAL FIELD

The present invention relates to a reception device, a communication system, a program, and a reception method.

BACKGROUND ART

In general, when a video signal is transmitted and received between a transmission device and a reception device, synchronization processing is performed to match the transmission time of the transmission device with a display time of the reception device in order to reduce a delay that occurs when the video signal is transmitted. The synchronization processing is executed using, for example, a time signal transmitted together with the video signal.

SUMMARY

Technical Problems

When the transmission device and the reception device are wiredly connected to each other, the video signal to be transmitted is less likely to be largely affected by a disturbance. Therefore, it is only necessary to perform simple synchronization processing. However, when the transmission device and the reception device are wirelessly connected to each other, there is a possibility that a large disturbance is included in a signal path.

A PLL (Phase Locked Loop) circuit is used in some cases to remove the influence by the disturbance. However, using the PLL circuit only to remove the influence by the disturbance causes an increase in cost. On the other hand, if no synchronization processing is performed when the transmission device and the reception device are wirelessly connected to each other, there is a risk that the frequencies and/or phases of the transmission time and the display time differ due to the disturbance, and missing frames, an increase in display delay, and the like occur.

The present invention has been made in view of the above-described problems, and the object thereof is to provide a reception device and a communication system for reducing the possibility of occurrence of problems such as missing frames and an increase in display delay even if a disturbance occurs in a communication path.

Solution to Problems

A reception device according to an aspect of the present invention includes a reception unit that sequentially receives image information transmitted by a transmission device at a given first interval by wireless communication, a display unit that sequentially displays frame images on the basis of the image information in accordance with a display clock and generates display time information indicating a time corresponding to an update time of the frame image, and a control unit that calculates a second interval indicating an interval at which the frame images are displayed on the basis of plural pieces of the display time information and controls an update cycle of the frame image in accordance with the display clock such that the second interval approximates to the first interval.

In addition, according to the reception device according to another aspect of the present invention, the image information includes generation time information indicating a time generated for each piece of image information, and the control unit calculates the first interval on the basis of the generation time information included in each of plural pieces of the image information.

In addition, according to the reception device according to another aspect of the present invention, the reception device further includes a processing unit that performs processing for each piece of received image information and generates processing time information corresponding to a time when the processing is to be performed, and the control unit further controls, on the basis of the processing time information and the display time information, such that a period of time from the time when the processing is performed to a time when the frame image is displayed approximates to a predetermined value.

In addition, according to the reception device according to another aspect of the present invention, the processing unit is a decoder that decodes the encoded image information and generates the processing time information indicating a time when the decoding of the image information is completed.

In addition, according to the reception device according to another aspect of the present invention, the reception device further includes a storage unit that stores at least a part of each of the image information of an n-th frame and the image information of an n+1-th frame, and when the reception unit receives the image information of the n+1-th frame, the storage unit updates the image information of an n−1-th frame to the image information of the n+1-th frame, and the display unit displays the frame image of the n-th frame stored by the storage unit.

In addition, according to the reception device according to another aspect of the present invention, the control unit controls the update cycle using the first interval and the second interval when a period of time in which an absolute value of a difference between the first interval and the second interval becomes larger than a first value continues for a first period of time or more, and controls the update cycle using the first interval, the second interval, the processing time information, and the display time information when a period of time in which the absolute value of the difference between the first interval and the second interval becomes smaller than a second value continues for a second period of time or more.

In addition, according to a communication system according to an aspect of the present invention, the communication system includes the reception device and a transmission device that transmits the generation time information and the image information to the reception device for each image.

In addition, according to a program according to an aspect of the present invention, the program causes a computer to execute a procedure for sequentially receiving image information transmitted by a transmission device at a given first interval by wireless communication, a procedure for sequentially displaying frame images on the basis of the image information in accordance with a display clock and generating display time information indicating a time corresponding to the update time of the frame image, and a procedure for calculating a second interval indicating an interval at which the frame images are displayed on the basis of plural pieces of the display time information and controlling the update cycle of the frame image in accordance with the display clock such that the second interval approximates to the first interval.

In addition, according to a reception method according to an aspect of the present invention, the reception method includes a step of sequentially receiving image information transmitted by a transmission device at a given first interval by wireless communication, a step of sequentially displaying frame images on the basis of the image information in accordance with a display clock and generating display time information indicating a time corresponding to the update time of the frame image; and a step of calculating a second interval indicating an interval at which the frame images are displayed on the basis of plural pieces of the display time information and controlling the update cycle of the frame image in accordance with the display clock such that the second interval approximates to the first interval.

DESCRIPTION OF EMBODIMENT

Figure 1:
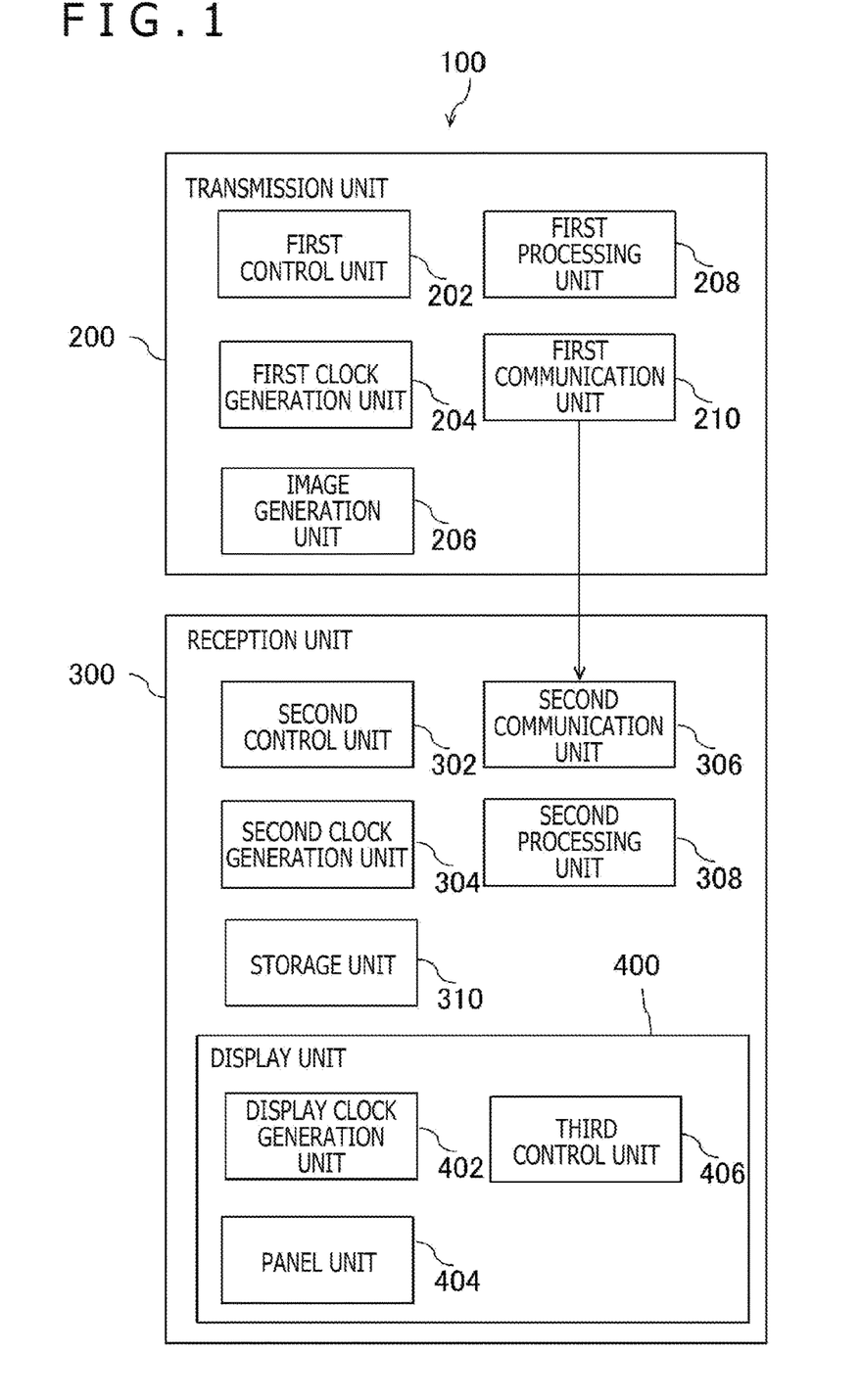
FIG. 1 is a functional block diagram of a communication system according to an embodiment of the present invention.

Hereinafter, an embodiment of the present invention will be described in detail on the basis of the drawings. FIG. 1 is a functional block diagram of a communication system 100 according to the embodiment. The communication system 100 according to the embodiment is a game system including, for example, a head-mounted display and a game machine for wirelessly transmitting a video signal to the head-mounted display.

As illustrated in FIG. 1, the communication system 100 includes a transmission unit 200 and a reception unit 300. The transmission unit 200 transmits generation time information and image information to the reception unit 300 for each frame image. The reception unit 300 sequentially receives the image information transmitted by the transmission unit 200 at a given first interval by wireless communication.

In addition, the transmission unit 200 includes a first control unit 202, a first clock generation unit 204, an image generation unit 206, a first processing unit 208, and a first communication unit 210. In addition, the reception unit 300 includes a second control unit 302, a second clock generation unit 304, a second communication unit 306, a second processing unit 308, a storage unit 310, and a display unit 400.

The first control unit 202 is, for example, a program control device such as a Central Processing Unit (CPU) that operates in accordance with a program installed in a memory (not illustrated). The first control unit 202 controls the operation of each unit included in the transmission unit 200.

The first clock generation unit 204 generates a first clock used in the first communication unit 210. Specifically, for example, the first clock generation unit 204 is an oscillation circuit including a crystal oscillator and generates the first clock that is a given frequency. Note that the first clock generation unit 204 may generate clocks to be used in other units included in the transmission unit 200.

The image generation unit 206 generates a frame image. Specifically, for example, the image generation unit 206 generates, per second, pieces of image information the number of which corresponds to a frequency (hereinafter, referred to as a frame frequency) of updating the frame image. For example, when the frame frequency is 120 Hz, the image generation unit 206 generates 120 pieces of image information per second.

Here, it is desirable that the image information includes generation time information indicating the time when the image information is generated for each piece of image information. For example, when the image information is information that conforms to the Moving Pictures Experts Group-4 (MPEG-4) standard, the image information includes the generation time information called PTS (presentation time stamp).

The first processing unit 208 performs processing for each piece of image information generated by the image generation unit 206. The processing is, for example, modulation or compression. Specifically, for example, the first processing unit 208 is an encoder that compresses the image information. When the first processing unit 208 modulates or compresses the image information, the transmission unit 200 can transmit, per second, the pieces of image information the number of which corresponds to the frame frequency to the reception unit 300. Note that when the image information is transmitted without being processed, the first processing unit 208 may be omitted.

The first communication unit 210 transmits the image information at the given first interval by wireless communication using the first clock. Specifically, the first communication unit 210 transmits the image information compressed or modulated by the first processing unit 208 to the reception unit 300 in accordance with a given wireless communication standard. The given wireless communication standard may be any communication standard as long as a communication speed at which the pieces of image information the number of which corresponds to the frame frequency can be transmitted per second is secured.

The second control unit 302 is a program control device such as a CPU that operates in accordance with a program installed in the storage unit 310. The second control unit 302 controls the operation of each unit included in the reception unit 300.

In addition, the second control unit 302 calculates a second interval indicating the interval at which the frame images are displayed on the basis of plural pieces of display time information, and controls the update cycle of the frame image in accordance with a display clock such that the second interval approximates to the first interval. Here, the second control unit 302 may further control, on the basis of processing time information and the display time information, such that a period of time from the time when the processing is performed to a time when the frame image is displayed approximates to a predetermined value. The specific control will be described later.

The second clock generation unit 304 generates a second clock used in each unit included in the reception unit 300. Specifically, for example, the second clock generation unit 304 is an oscillation circuit including a crystal oscillator, and generates the second clock that is a given frequency.

Here, the first clock generation unit 204 and the second clock generation unit 304 are configured such that the frequencies of the first clock and the second clock become the same frequency in design. However, even if the specifications of each part included in the first clock generation unit 204 and the second clock generation unit 304 are the same, an error exists in the characteristics of each part. In addition, the transmission unit 200 and the reception unit 300 are structurally separated from each other, and are put in different environments (for example, temperatures and the like). In this case, since the characteristics of the same parts included in the first clock generation unit 204 and the second clock generation unit 304 are different from each other, the frequencies of the first clock and the second clock are usually different from each other.

The second communication unit 306 receives the image information at a given second interval by wireless communication using the second clock. Specifically, the second communication unit 306 receives the image information from the first communication unit 210 in accordance with the above-described wireless communication standard.

Here, it is desirable that the first interval that is the interval at which the first communication unit 210 transmits the image information and the second interval that is the interval at which the second communication unit 306 receives the image information are the same. However, since the first communication unit 210 and the second communication unit 306 perform communications by wireless communication, there is a risk that the communications are affected by a disturbance. In addition, as described above, there is a risk that the first clock used in the first communication unit 210 and the second clock used in the second communication unit 306 are different from each other. Thus, the first interval and the second interval are usually different from each other. The difference causes problems such as missing frames and an increase in display delay.

The second processing unit 308 performs processing for each piece of received image information and generates processing time information in accordance with the time when the processing is to be performed. The processing is, for example, demodulation or decompression. Specifically, for example, the second processing unit 308 is a decoder that decodes the encoded image information, and generates the processing time information indicating the time when the decoding of the image information is completed. When the second processing unit 308 processes the image information, the display unit 400 can display the frame image on the basis of the image information.

Note that when the image information is transmitted without being processed, the second processing unit 308 may be omitted. In this case, the processing time information may be information indicating the time when the second communication unit receives the image information.

The storage unit 310 is a storage element such as a Read-Only Memory (ROM) or a Random Access Memory (RAM), or a hard disk drive. The storage unit 310 stores programs and the like to be executed by the second control unit 302.

In addition, the storage unit 310 stores at least a part of each of the image information of the n-th frame and the image information of the n+1-th frame. Then, when the second communication unit 306 receives the image information of the n+1-th frame, the storage unit 310 updates the image information of the n−1-th frame to the image information of the n+1-th frame. Specifically, for example, when the second communication unit 306 first receives the image information of the first frame, the storage unit 310 stores the image information of the first frame. Next, when the second communication unit 306 receives the image information of the second frame, the storage unit 310 stores the image information of the second frame. Further, when the second communication unit 306 receives the image information of the third frame, the storage unit 310 overwrites with and stores the image information of the third frame in the region where the image information of the first frame is stored. Thereafter, when the second communication unit 306 receives the image information of the n-th frame, the storage unit 310 overwrites with and stores the image information of the n-th frame in the region where the image information of the n−2-th frame is stored. Accordingly, the storage unit 310 stores the image information for two frames. The storage unit 310 functions as a buffer when the image information of the n+1-th frame is read out to the display unit 400 at the same time when the image information of the n-th frame is rewritten.

The display unit 400 sequentially displays the frame images on the basis of the image information in accordance with the display clock and generates the display time information indicating the time corresponding to the update time of the frame image. Specifically, for example, the display unit 400 is a display device such as a liquid crystal display device or an organic Electroluminescence (EL) display device.

The display unit 400 has a display clock generation unit 402, a panel unit 404, and a third control unit 406. When the second communication unit 306 receives the image information of the n+1-th frame, the display unit 400 displays the frame image of the n-th frame stored by the storage unit 310.

The display clock generation unit 402 generates a display clock. Specifically, for example, the display clock generation unit 402 generates the display clock used by the panel unit 404 on the basis of the second clock and a control amount C generated by the second control unit 302.

The panel unit 404 is a glass substrate or a resin substrate on which an electronic circuit necessary for display is formed. The panel unit 404 displays the frame image of the n-th frame stored in the storage unit 310 in accordance with an instruction of the third control unit 406.

The third control unit 406 is a device for controlling the operation of each unit of the display unit 400. Specifically, for example, the third control unit 406 controls the update cycle of the frame image on the basis of the control amount C generated by the second control unit 302.

The update cycle is controlled by changing a frequency or a blanking period of the display clock. Specifically, when the update cycle is shortened, the third control unit 406 controls to increase the frequency of the display clock or to shorten the blanking period. On the other hand, when the update cycle is made longer, the third control unit 406 controls to lower the frequency of the display clock or to make the blanking period longer.

Figure 2:
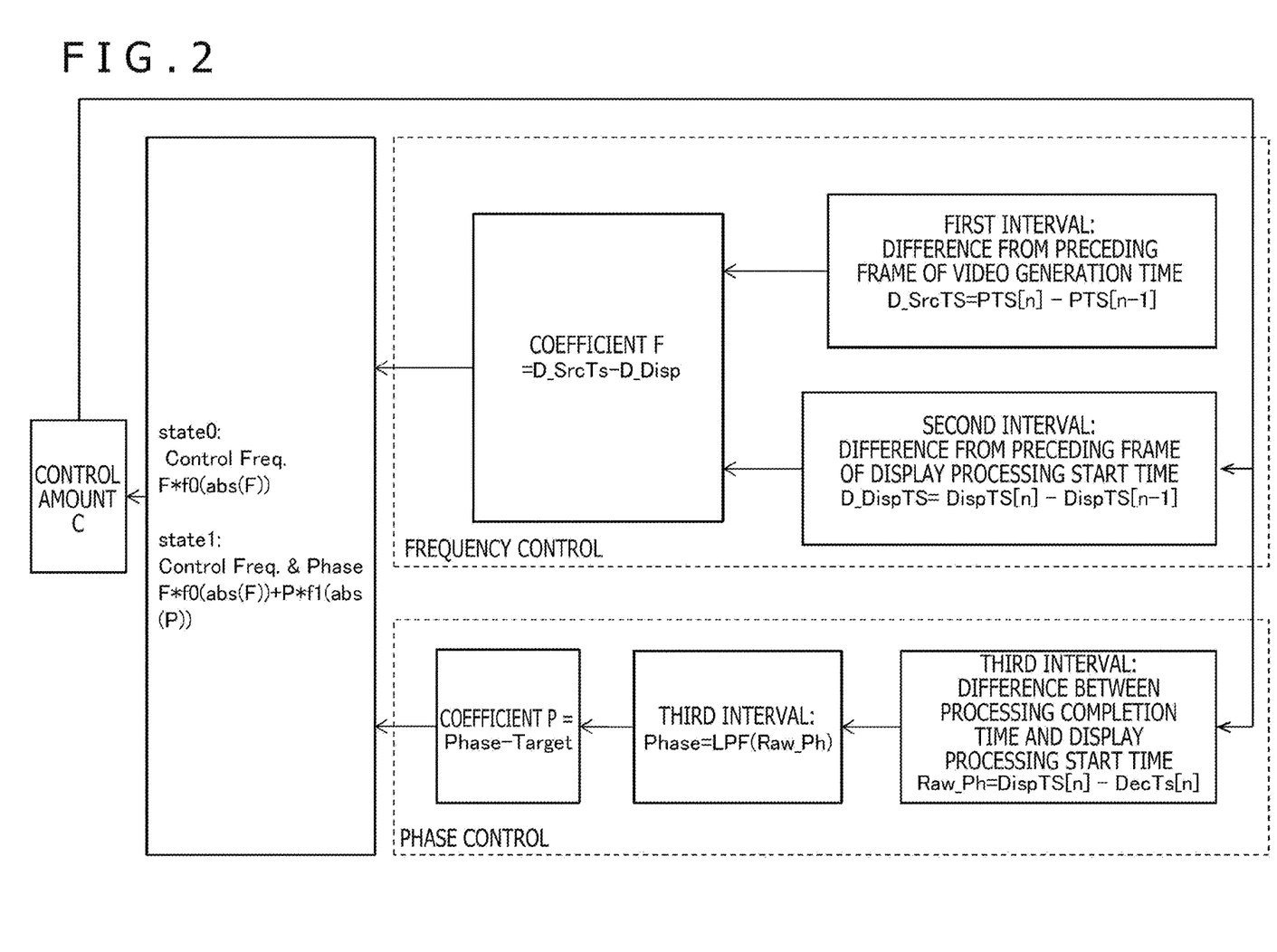
FIG. 2 is a diagram for describing calculation of a control amount according to the embodiment of the present invention.
Figure 3:
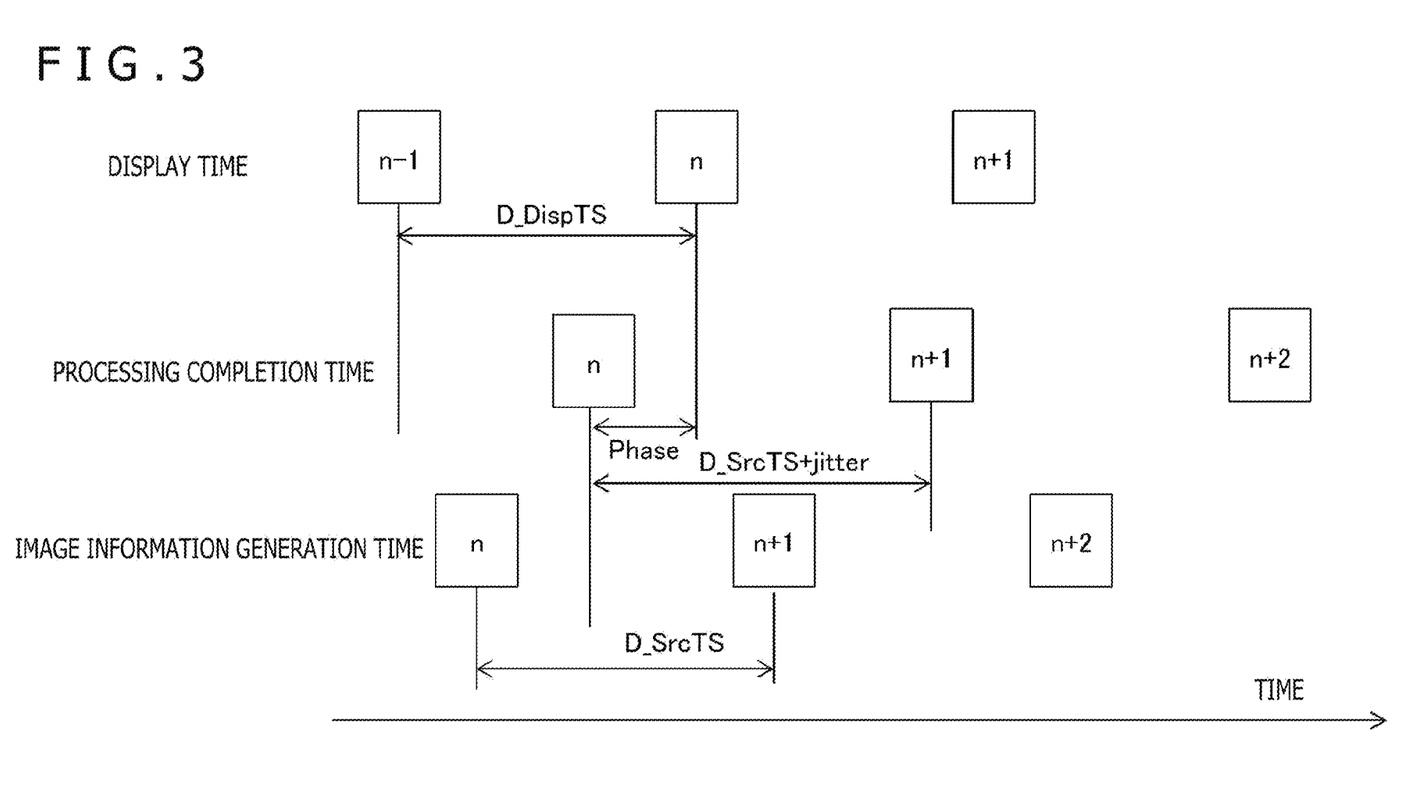
FIG. 3 is a diagram for illustrating a relationship among a display time, a processing completion time, and an image information generation time.

Next, generation of the control amount C by the second control unit 302 will be described. FIG. 2 is a diagram for describing calculation of the control amount C. In addition, FIG. 3 is a diagram for illustrating a relationship among a display time, a processing completion time, and an image information generation time. The letters enclosed in the square frames included in FIG. 3 indicate the order of the frames. The display time indicates the time when each frame starts. The processing completion time indicates the time when the second processing unit 308 completes the processing. The video generation time indicates the time when the image generation unit 206 generates the image information.

Note that the display time indicates the time when each frame starts in FIG. 3, but may indicate the time when the display is completed or the time when a predetermined time elapses after the start of the display. In addition, the processing completion time may be not the time when the processing is completed but the time when the processing starts or the time when the second communication unit 306 completes the reception of the image information.

Note that a specific example in which the second communication unit 306 is in the process of receiving the image information of the n+1-th frame in a state where the storage unit 310 has stored at least a part of each of the frame image information of the n−1-th frame and the frame image information of the n-th frame will be described below.

First, the second control unit 302 calculates the first interval. Specifically, for example, the second control unit 302 calculates the first interval on the basis of the generation time information included in each of plural pieces of image information. The second control unit 302 subtracts the time indicated by the generation time information (PTS (n−1)) included in the image information of the n−1-th frame from the time indicated by the generation time information (PTS (n)) included in the image information of the n-th frame. The second control unit 302 acquires the subtracted value as the first interval (D_SrcTS). As illustrated in FIG. 3, the first interval (D_SrcTS) is an interval between the time when the image information of one frame is generated and the time when the image information of the next frame is generated.

Next, the second control unit 302 calculates the second interval. Specifically, for example, the second control unit 302 calculates the second interval on the basis of plural pieces of display time information. The second control unit 302 subtracts the time indicated by the generation time information (DispTS (n−1)) included in the image information of the n−1-th frame from the time indicated by the display time information (DispTS (n)) of the n-th frame. The second control unit 302 acquires the subtracted value as the second interval (D_DispTS).

The display time information is, for example, a vertical synchronization signal acquired from the display unit 400 by the second control unit 302. The vertical synchronization signal is a signal having a period for displaying one frame image as a cycle, and is, for example, a signal including one pulse in one cycle. The second control unit 302 acquires the second interval (D_DispTS) by subtracting the time when the vertical synchronization signal of the n−1-th frame is acquired from the time when the vertical synchronization signal of the n-th frame is acquired. As illustrated in FIG. 3, the second interval (D_DispTS) is an interval between the time when the display of the n-th frame starts and the time when the display of the n+1-th frame starts.

Then, the second control unit 302 subtracts the second interval from the first interval to calculate a coefficient F (D_SrcTS-DispTS). The coefficient F is information indicating a deviation between a time interval at which the image information is generated and a time interval of display actually performed on the basis of the image information. That is, the coefficient F is information indicating a frequency deviation.

Note that the times when the first interval and the second interval are calculated need not be synchronized with the time when the display unit 400 updates the frame image. In addition, it is desirable that the second control unit 302 calculates the first interval and the second interval plural times in one frame period. Specifically, in a case where the ideal frame update frequency of the display unit 400 is 120 Hz, the cycle in which the display unit 400 updates the frame image is approximately 8.33 ms. On the contrary, the generation time information is generated at, for example, 90 kHz. In this case, the second control unit 302 may calculate the first interval and the second interval at 90 kHz.

Here, as illustrated in FIG. 3, an interval (D_SrcTS+jitter) between the processing completion times of the n-th frame and the n+1-th frame usually includes an inconstant component (jitter) due to the influence of a disturbance or the like. Since the display unit 400 sequentially displays the frame images on the basis of the image information, the second interval is not constant in a case where the processing completion time differs for each frame.

Accordingly, the second control unit 302 may perform processing such that the second interval (D_DispTS) falls within a predetermined range. Specifically, when the second interval (D_DispTS) is a value smaller than a set lower limit value, the second control unit 302 may set the second interval (D_DispTS) as the lower limit value, and when the second interval (D_DispTS) is a value larger than a set upper limit value, the second interval (D_DispTS) may be set as the upper limit value. For example, in a case where the ideal frame update frequency of the display unit 400 is 120 Hz, the lower limit value is set to 8.00 ms, and the upper limit value is set to 8.66 ms.

In addition, the second control unit 302 may perform processing for smoothing the second interval (D_DispTS). For example, the second control unit 302 may calculate the moving average of the second interval (D_DispTS) calculated in a period of 8.33 ms.

Next, the second control unit 302 calculates a third interval (Raw_Ph). Specifically, for example, the second control unit 302 calculates the third interval in the n-th frame on the basis of the time when the processing by the second processing unit 308 is completed and the display time information. The second control unit 302 subtracts the time indicated by the time (DecTS (n)) when the processing of the n-th frame is completed from the time indicated by the display time information (DispTS (n)) of the n-th frame. The second control unit 302 acquires the subtracted value as the third interval (Raw_Ph).

Next, the second control unit 302 performs processing for smoothing the third interval. Specifically, for example, the second control unit 302 performs moving average processing and low-pass filter processing (Phase=LPF (Raw_Ph)) by an operation. Techniques known from the past may be applied to the processing. Hereinafter, the smoothed third interval (Raw_Ph) is written as a third interval (Phase). As illustrated in FIG. 3, the third interval (Phase) is an interval between the time when the processing of the n-th frame is completed and the time when the display of the frame image starts on the basis of the image information of the n-th frame.

Then, the second control unit 302 calculates a coefficient P (Phase-Target) by subtracting a target value (Target) of a period of time required from the time when the processing is performed to the time when the display of the frame image starts from the third interval (Phase). The target value (Target) is a value set as a period of time required from the time when the processing is performed to the time when the display of the frame image starts under an ideal environment. That is, the coefficient P is information indicating a difference between the actually-required period of time and the ideal period of time from the time when the processing is performed to the time when the display of the frame image starts. That is, the coefficient P is information indicating a phase deviation.

Here, the first interval and the second interval match each other and do not change with time in an ideal environment where a disturbance or the like does not exist. In addition, the third interval is also constant. Therefore, a period of time from the time when the image information of the n-th frame is stored in the storage unit 310 after the second processing unit 308 processes the image information of the n-th frame to the time when the display by the display unit 400 starts is constant. In this case, the coefficient P is 0. However, the period of time required from the time when the processing is performed to the time when the display of the frame image starts actually varies due to the disturbance or the like as described above. Therefore, the coefficient P calculated by subtracting the target value (Target) from the third interval is usually not 0.

Next, in a case where a period of time in which an absolute value of the difference between the first interval and the second interval becomes larger than a first value continues for a first period of time or more, the second control unit 302 controls the update cycle using the first interval and the second interval. In addition, in a case where a period of time in which the absolute value of the difference between the first interval and the second interval becomes smaller than a second value continues for a second period of time or more, the second control unit 302 controls the update cycle using the first interval, the second interval, the processing time information, and the display time information. That is, the second control unit 302 divides the case into two states according to the magnitudes of the coefficient F and the coefficient P, and calculates the control amount C for controlling the update cycle of the frame image by a different method according to the states.

Figure 4:
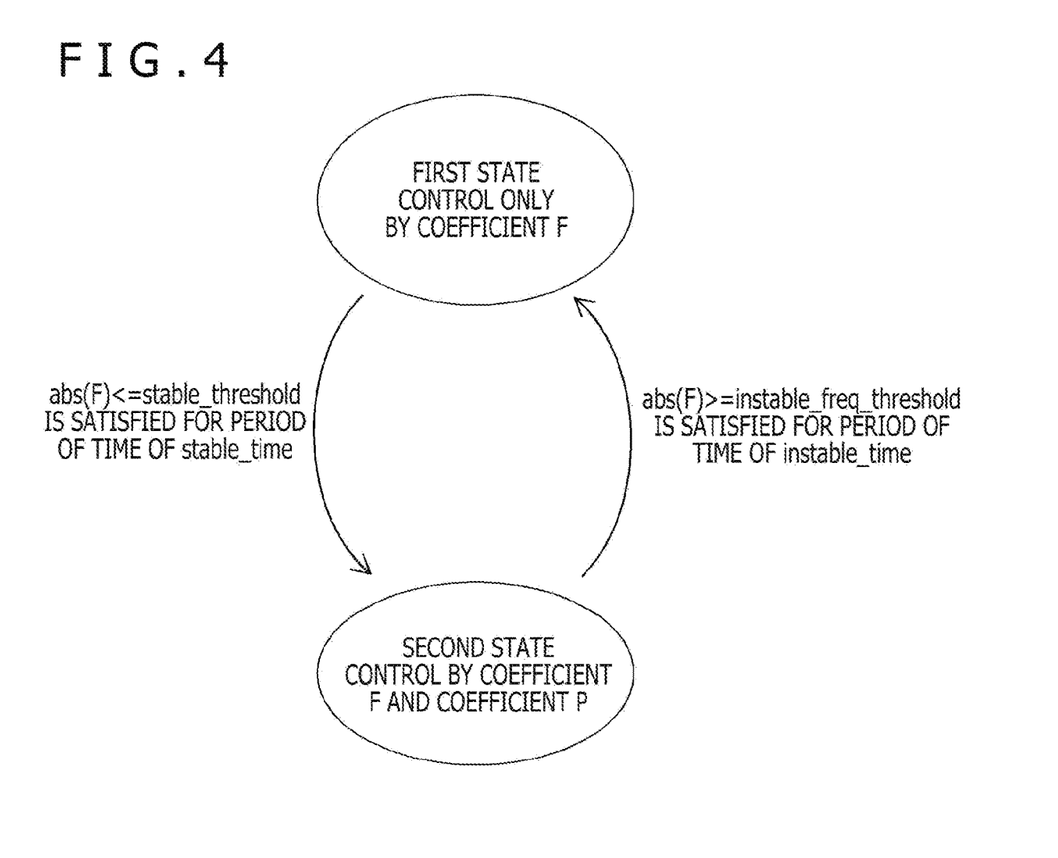
FIG. 4 is a state transition diagram according to the embodiment of the present invention.

The two states will be described using a state transition diagram illustrated in FIG. 4. The initial state is a first state in which control is performed only by the coefficient F. In a case where a period of time in which the absolute value of the coefficient F becomes smaller than the second value (stable_threshold) continues for the second period of time (stable_time) or more, the state transits from the first state to the second state. The second state is a state in which control is performed by the coefficient F and the coefficient P. When a period of time in which the absolute value of the coefficient F becomes larger than the first value (instable_freq_threshold) continues for the first period of time (instable_time) or more, the state transits from the second state to the first state.

The first state is a state in which a deviation between the time interval at which the image information is generated and the time interval of display actually performed on the basis of the image information is large. Thus, it is necessary to largely change the update cycle of the frame image. Specifically, for example, in the case of the first state, the second control unit 302 calculates the control amount C in accordance with Equation 1. The function $f_0$ of Equation 1 is a function of outputting a value proportional to the absolute value of the coefficient F. The control amount C does not include a component P related to the phase.

$$C=F\times f_0(\text{abs}(F)) \qquad [\text{Math. 1}]$$

On the other hand, the second state is a state in which a deviation between the time interval at which the image information is generated and the time interval of display actually performed on the basis of the image information is small. Thus, it is not necessary to largely change the update cycle of the frame image. Specifically, for example, in the case of the second state, the second control unit 302 calculates the control amount C in accordance with Equation 2. The function $f_1$ of Equation 2 is a function of outputting a value proportional to the absolute value of the coefficient P.

$$C=F\times f_0(\text{abs}(F))+P\times f_1(\text{abs}(P)) \qquad [\text{Math. 2}]$$

The second control unit 302 controls the update cycle of the frame image using the control amount C. Specifically, the second control unit 302 changes the update cycle of the current frame image only by the control amount C. That is, when the control amount C is a positive value, the second control unit 302 makes the update cycle of the frame image longer (that is, decreases the update frequency of the frame image). On the other hand, when the control amount C is a negative value, the second control unit 302 shortens the update cycle of the frame image (that is, increases the update frequency of the frame image).

The first state is a state in which the above-described deviation is large and it is necessary to control the frequency before matching the phases. Therefore, the coefficient F larger than that in the second state is calculated on the basis of Equation 1 in the first state. Thus, in the first state, the update cycle of the frame image is changed more largely than in the second state. On the other hand, the second state is a state in which the above-described deviation is small and it is necessary to control the phase. Thus, the update cycle of the frame image is controlled such that the coefficient P approximates to the target value (Target) on the basis of Equation 2 indicating that the component of the coefficient P is included in the control amount C.

Note that the component of the coefficient F is also included in Equation 2. Accordingly, the second control unit 302 can not only control the update cycle of the frame image so as to align the phases on the basis of the coefficient P, but also prevent the frequency from being largely deviated on the basis of the coefficient F. The coefficient F and the coefficient P are controlled to become smaller by repeating the above-described control.

Note that the second control unit 302 converts the control amount C into a format that can be recognized by the display unit 400, and then transmits the converted signal to the display unit 400. The display unit 400 changes the update cycle of the frame image by changing the frequency of the display clock or the length of the blanking period by using the signal. As described above, the second control unit 302 controls the update cycle of the frame image such that the second interval approximates to the first interval.

Note that the present invention is not limited to the above-described embodiment. In addition, the above-described specific letter strings and numerical values and the specific letter strings and numerical values in the drawings are illustrative, and the present invention is not limited to these letter strings and numerical values.

For example, the second control unit 302 may control the frequency of the display clock using the coefficient F and control the length of the blanking period using the coefficient P. The coefficient F is information on which a deviation between the frequency at which the image information is generated and the update frequency of the frame image is reflected. On the other hand, the coefficient P is information on which a deviation between the time when the image information is generated and the time when the display of the frame image starts is reflected. That is, the coefficient F is information indicating a frequency deviation, and the coefficient P is information indicating a phase deviation. Therefore, the second control unit 302 may control the frequency of the display clock using the coefficient F indicating the frequency deviation and control the length of the blanking period using the coefficient P indicating the phase deviation. It is possible to further reduce the possibility of missing frames and an increase in display delay under the control.

The invention claimed is:

1. A reception device comprising:
   a reception unit that sequentially receives image information transmitted by a transmission device at a given first interval by wireless communication;
   a display unit that sequentially displays frame images on a basis of the image information in accordance with a display clock and generates display time information indicating a time corresponding to an update time of the frame image; and a control unit that calculates a second interval indicating an interval at which the frame images are displayed on a basis of plural pieces of the display time information and controls an update cycle of the frame image in accordance with the display clock such that the second interval approximates to the first interval; wherein the first interval and the second interval are calculated by the control unit plural times in each of a plurality of frame periods at times without synchronization with an ideal frame update frequency of the display unit.

2. The reception device according to claim 1, wherein the image information includes generation time information indicating a time generated for each piece of image information, and wherein the control unit calculates the first interval on a basis of the generation time information included in each of plural pieces of the image information.

3. The reception device according to claim 1, further comprising:

a processing unit that performs processing for each piece of received image information and generates processing time information corresponding to a time when the processing is to be performed, wherein the control unit further causes, on a basis of the processing time information and the display time information, a period of time from the time when the processing is performed to a time when the frame image is displayed to approximate to a predetermined value.

4. The reception device according to claim 3, wherein the processing unit is a decoder that decodes the encoded image information and generates the processing time information indicating a time when the decoding of the image information is completed.

5. The reception device according to claim 1, further comprising:

a storage unit that stores at least a part of each of the image information of an n-th frame and the image information of an n+1-th frame, wherein, when the reception unit receives the image information of the n+1-th frame, the storage unit updates the image information of an n−1-th frame to the image information of the n+1-th frame, and wherein the display unit displays the frame image of the n-th frame stored by the storage unit.

6. The reception device according to claim 3, wherein the control unit controls the update cycle using the first interval and the second interval when a period of time in which an absolute value of a difference between the first interval and the second interval becomes larger than a first value continues for a first period of time or more, and wherein the control unit controls the update cycle using the first interval, the second interval, the processing time information, and the display time information when a period of time in which the absolute value of the difference between the first interval and the second interval becomes smaller than a second value continues for a second period of time or more.

7. A communication system comprising:

a reception device including a reception unit that sequentially receives image information transmitted by a transmission device at a given first interval by wireless communication, a display unit that sequentially displays frame images on a basis of the image information in accordance with a display clock and generates display time information indicating a time corresponding to an update time of the frame image, and a control unit that calculates a second interval indicating an interval at which the frame images are displayed on a basis of plural pieces of display time information and controls the update cycle of the frame image in accordance with the display clock such that the second interval approximates to the first interval, the image information including generation time information indicating a time generated for each image information, the control unit calculating the first interval on a basis of the generation time information included in each of plural pieces of the image information; and a transmission device that transmits the generation time information and the image information to the reception device for each image; wherein the first interval and the second interval are calculated by the control unit plural times in each of a plurality of frame periods at times without synchronization with an ideal frame update frequency of the display unit.

8. A non-transitory, computer readable storage medium containing a computer program, which when executed by a computer, causes the computer to perform a reception method by carrying out actions, comprising:

sequentially receiving image information transmitted by a transmission device at a given first interval by wireless communication;

sequentially displaying frame images on a basis of the image information in accordance with a display clock and generating display time information indicating a time corresponding to an update time of the frame image; and calculating a second interval indicating an interval at which the frame images are displayed on a basis of plural pieces of the display time information and controlling the update cycle of the frame image in accordance with the display clock such that the second interval approximates to the first interval; wherein the first interval and the second interval are calculated by the control unit plural times in each of a plurality of frame periods at times without synchronization with an ideal frame update frequency of the display unit.

9. A reception method comprising:

sequentially receiving image information transmitted by a transmission device at a given first interval by wireless communication;

sequentially displaying frame images on a basis of the image information in accordance with a display clock and generating display time information indicating a time corresponding to an update time of the frame image, and calculating a second interval indicating an interval at which the frame images are displayed on a basis of plural pieces of the display time information and controlling an update cycle of the frame image in accordance with the display clock such that the second interval approximates to the first interval; wherein the first interval and the second interval are calculated by the control unit plural times in each of a plurality of frame periods at times without synchronization with an ideal frame update frequency of the display unit.

* * * * *